J. Q. Simonson, Filter and Cistern,
No. 119,189     Fig. 1.     Patented Sep. 19, 1871.
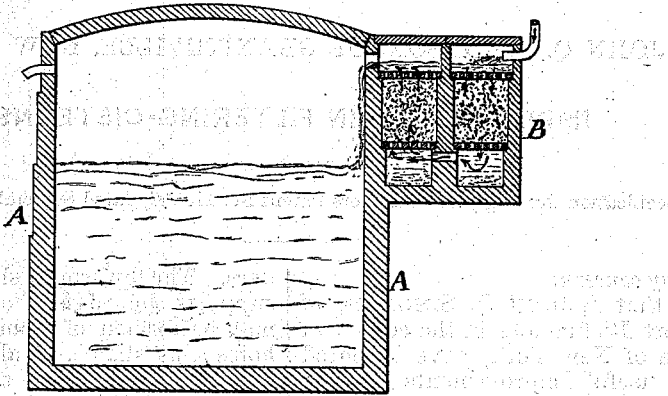
Fig. 2.
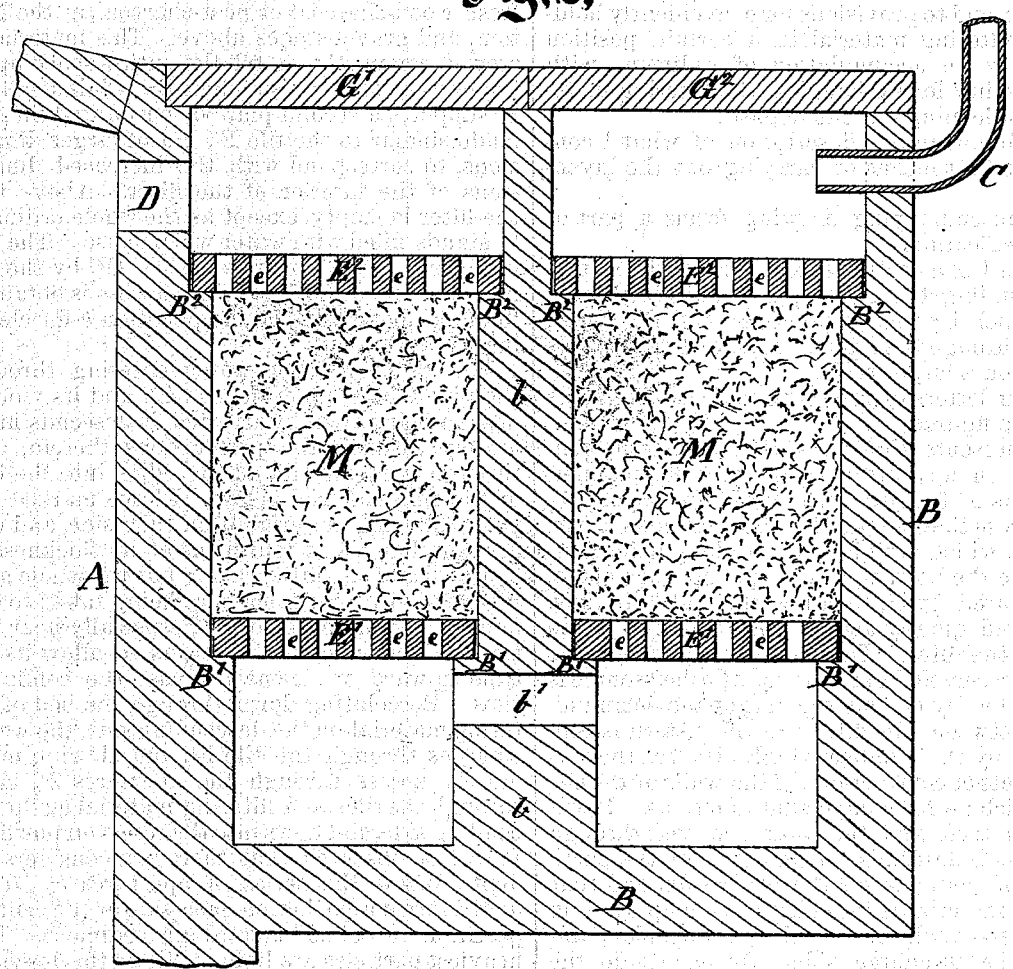
Witnesses,
C. C. Livings
A. Hoermann.
Inventor,
J. Q. Simonson
by his Attorney J. L. Stetson

UNITED STATES PATENT OFFICE.

JOHN Q. SIMONSON, OF GRANITEVILLE, NEW YORK.

IMPROVEMENT IN FILTERING-CISTERNS.

Specification forming part of Letters Patent No. 119,189, dated September 19, 1871.

*To all whom it may concern:*

Be it known that I, JOHN Q. SIMONSON, of Graniteville, (Port Richmond,) in the county of Richmond, State of New York, have invented certain new and useful Improvements in Combined Filters and Cisterns, of which the following is a specification:

The invention relates to the construction of the filter, and to provisions for conveniently holding the filtering material in a certain position and allow an accumulation of sediment, with great facility for exchanging the filtering material and cleaning out the deposit.

The following is a description of what I consider the best means of carrying out the invention.

The accompanying drawing forms a part of this specification.

Figure 1 is a section through the entire structure, including the cistern, in about the proportions which I prefer in practice; and Fig. 2 is a section through the filter alone, showing the parts thereof on a larger scale.

Similar letters of reference indicate like parts in all the figures.

A represents the walls of the cistern, constructed in any ordinary or suitable manner. The walls of the filter are represented by B, $B^1$, &c. Across the center of the filter extends a partition, $b$, which is tight, except along a line a little above the bottom, where openings are made, as indicated by $b'$, to allow the water to flow gently and quietly across from one side to the other of the filter. The spout through which the water is received from the roof or other source is represented by C, and the exit or the communication between the filter and the cistern is represented by D. I indicate by $B^1$, $B^2$, &c., the several offsets or contractions of the walls of the cistern, which perform important functions. It will be understood that the water received through the spout C descends on one side of the partition $b$ and ascends on the other side, and that filtering material is intended to be employed on each side—to wit, on the descending side, and also on the ascending side. On each side the horizontal dimensions of the filter are less near the bottom than at the middle height; and again, less at the middle height than near the top. The changes of dimension are produced not by gradual taper, but by horizontal offsets or shoulders. The lowermost shoulder is marked $B^1$ and supports the edge of a tile or plate $E^1$, which may be formed of Roman cement molded with holes $e$, as shown, to allow a sufficient passage for the water. There are two of these plates, one on each side of the center of the partition $b$. Above each of these is applied a thick and well-spread layer of filtering material, preferably fresh wood-charcoal or peat-charcoal, at the bottom, and gravel-stones above. This material is stowed compactly, to fill the entire space up to the level of the next shoulder $B^2$. This shoulder $B^2$ supports a second plate or perforated tile, $E^2$, made similar to the tile $E^1$, but of larger dimensions, to correspond with the increased dimensions of the interior of the filter. Above this the filter is empty, except as the whole ordinarily stands filled with water when in use. The top is covered by two flag-stones, $G^1$ $G^2$, by the removal of one or both of which access is obtained to one or both sides of the partition $b$ for cleaning.

The rain or other water entering through the pipe C falls upon the tile $E^2$, and its violent motion being thereby arrested, it descends moderately through the perforations therein, and through the joint around the edge, into the bed of filtering material below. I have marked the entire filtering material M on each side, and will assume that about four-fifths of its thickness is charcoal and one-fifth gravel; but the whole may be charcoal if preferred, care being taken to use none of the material so fine, especially near the top and bottom of the layer, as to allow its escape upward or downward past the confining tiles. Percolating down through the bed of filtering material on the descending side, the water emerges through the tile $E^1$, and, flowing moderately across through the apertures $b'$, rises through the tiles and filtering material on the ascending side, and flows into the reservoir purified. It will be observed that there is a considerable depth below the series of apertures $b'$. This depth forms a pocket on each side of the central partition to collect and retain sediment. The heaviest particles are liable to lie on the descending side, but the motion of the water being directly downward on this side is liable to circulate downward past the orifices $b'$ and agitate the bottom of the pocket sufficiently to prevent the retention of the lightest mud or other foreign matter. The lightest is retained on the pocket on the other side, the ascending side of the filter. Here the pocket is entirely undisturbed by any motion of the water. The water flows very gently through the capacious orifices $b'$ in a horizontal direction, and there the motion is arrested and transformed into a gentle upward motion through the filter without any possibility of agitating the light sediment in the bottom. After the filter has operated for a sufficient period, or at any time when preferred, the covering flags $G^1$ $G^2$ being removed, the entire contents of one or both sides of the filter may be removed and exchanged with a few minutes' labor. The frequency of this operation depends on the character of the water, the capacity of the filter relatively to the quantity of water, or the fancy of the owner. The capacity of the filter need ordinarily be only that of a barrel, or, at most, of a large wine-cask for a large cistern, and to clean the filter it is only necessary to remove the small quantity of water therein contained.

I have spoken of covering the charcoal with gravel-stones partly because there is common belief that such practice tends to increase the purity of the water; but the necessity for such a covering is almost or quite removed by the employment of my tiles $E^1$ $E^2$ as a covering. The protection thereby afforded against the displacement of the charcoal or other really purifying material is much greater than can be secured by the employment of a few loose stony particles, and the facility for the removal of the covering material is greatly increased by my invention. By my invention the stony covering for the purifying charcoal is in effect aggregated into one continuous and open-work layer, which may be removed altogether; and while such a perforated tile might be used, and I believe could be used, with some benefit without my supporting shoulders by resting directly upon the charcoal, I greatly prefer the construction shown, whereby the shoulders hold the tile in a perfectly horizontal position and at a fixed level under all circumstances. The shoulders prevent the tile from any possibility of becoming tilted and inclined out of position either by carelessness in the placing of the material or by any subsequent washing or change of condition in the filtering matter.

The lower tiles $E^1$ perform functions which are still more indispensable to my system. Being held up strongly and in a level position on the shoulders $B^1$, they support the filtering material efficiently above and guarantee the clear space, filled only with water below, in which the current becomes so gentle that the sediment separates and falls. The work may all be made in masonry and Roman cement, without expense for metal work or necessity for any very great degree of skill. The cleaning of the bottom, the replacing of the tiles, and the refilling with charcoal is all work of a very simple character, which may be done by the commonest laborer.

I have represented the filter as square, or with the several chambers therein rectangular, with the offsets $B^1$ and $B^2$ extending quite around and along both faces of the central partition $b$. It is not essential that the offsets on the opposite side of the central partition shall be at the same level, and some portion of the benefit of the invention may be realized by the employment of the offsets and tiles only on the ascending side of the filter, leaving the descending side to be filled by rough charcoal and stone and gravel in the ordinary manner, or to be left empty altogether. I prefer, however, the entire construction and arrangement as herein shown.

I claim—

The within-described stationary filter B, having a passage, $b'$, for the water through the partition $b$, elevated above the base, as shown, so as to leave pockets below the level of the communicating passage or passages for the collection of sediment, and having the filtering material in a layer or layers, M, in the middle height, arranged and operating as herein specified.

In testimony whereof I have hereunto set my name in presence of two subscribing witnesses.

JOHN Q. SIMONSON.

Witnesses:
  A. HOERMANN,
  THOMAS. D. STETSON.